US008176897B1

(12) United States Patent
Guglielmo et al.

(10) Patent No.: US 8,176,897 B1
(45) Date of Patent: May 15, 2012

(54) ELECTRONIC PRESSURE REGULATOR

(75) Inventors: Kennon H. Guglielmo, San Antonio, TX (US); Michael Walser, Comfort, TX (US); Randy Walser, Canadian, TX (US); Kenneth R. Shouse, Fair Oaks Ranch, TX (US)

(73) Assignee: E-Controls, Inc., San Antonio, TX (US)

( * ) Notice: Subject to any disclaimer, the term of this patent is extended or adjusted under 35 U.S.C. 154(b) by 27 days.

(21) Appl. No.: 12/978,190

(22) Filed: Dec. 23, 2010

Related U.S. Application Data

(62) Division of application No. 11/823,945, filed on Jun. 29, 2007, now Pat. No. 8,006,668.

(60) Provisional application No. 60/817,548, filed on Jun. 29, 2006.

(51) Int. Cl.
*F02B 43/00* (2006.01)
(52) U.S. Cl. ....................................................... 123/458
(58) Field of Classification Search .................. 123/458, 123/445, 457, 525, 527, 27 GE
See application file for complete search history.

(56) References Cited

U.S. PATENT DOCUMENTS

| | | | | |
|---|---|---|---|---|
| 4,422,423 A | * | 12/1983 | Sugiyama et al. | 123/438 |
| 5,579,739 A | * | 12/1996 | Tuckey et al. | 123/467 |
| 5,808,671 A | | 9/1998 | Maycock et al. | |
| 5,905,713 A | | 5/1999 | Anderson et al. | |
| 6,041,762 A | | 3/2000 | Sirosh et al. | |
| 6,131,552 A | * | 10/2000 | Paielli et al. | 123/527 |
| 6,701,905 B1 | | 3/2004 | Gaskins | |
| 7,841,440 B2 | * | 11/2010 | Liu | 180/274 |
| 8,006,668 B1 | * | 8/2011 | Guglielmo et al. | 123/458 |

* cited by examiner

*Primary Examiner* — Hieu T Vo
(74) *Attorney, Agent, or Firm* — Haynes and Boone, LLP; William B. Nash; Joe Mencher

(57) ABSTRACT

The invention includes a very fast voice coil actuator, in the range of 2-5 millisecond full stroke response with high force, a circuit board located in the enclosure, a pressure sensor sensing pressure internal to the system which in the preferred embodiment is located in the actuator cap assembly but could be located in other locations, a diaphragm, a link plate, a mating ring, and a mechanical pressure regulator. An electronic pressure regulator receives pressure commands from the engine control module in a manner similar to receiving pulse width from an engine control module to an injector and calculates the required new pressure command. A novel feature of the present invention includes the Delta P control and the control of the regulator based on direct feedback of pressure.

20 Claims, 9 Drawing Sheets

ELECTRONIC PRESSURE REGULATOR

CROSS REFERENCE TO RELATED APPLICATIONS

The present application is related to (10 U.S. Utility application Ser. No. 12/978,109 filed on 23 Dec. 2010, now U.S. Pat. No. 8,136,506 B1, issued on 20 Mar. 2012, and (2) U.S. Utility application Ser. No. 12/978,215 filed on 23 Dec. 2010, and is a divisional of U.S. patent application Ser. No. 11/823,945 filed on Jun. 29, 2007, now U.S. Pat. No. 8,006,668 B1, issued on 30 Aug. 2011, which claim priority to Provisional Patent Application No. 60/817,548 filed on Jun. 29, 2006, the disclosures of which are incorporated herein by reference.

BACKGROUND OF THE INVENTION

1. Field of the Invention

The present invention relates to an electronic pressure regulator that can be used for gaseous fuel control on internal combustion engines. More particularly, the present invention related to an electronic pressure regulator that has direct acting electro-mechanical operation with pressure sensor feedback.

2. Prior Art

Most of the fuel control in the world for spark ignited engines or engines in general is not electronic fuel injection. In some particular markets, mainly gaseous fuel, for example, LPG and natural gas, there are issues that make fuel injection less desirable. With LPG, it is contamination. The LPG quality in the world, especially in the United States, is not controlled very well and so you have a lot of heavy-end hydrocarbons that has equally plugged up your injectors.

A pressure regulator is a device that maintains a desired pressure quantity at a predetermined value or varies according to a predetermined plan. Most fuel pressure regulators for internal combustion engines are purely mechanical devices, have a fixed orifice and work off a diaphragm, piston, or other pressure balance mechanism. Mechanical regulators use a force balance to set orifice size based on spring force verses the difference in pressure between the inlet and outlet sides of the regulator. These regulators cannot make accommodations for variation in engine operating conditions in order to provide an optimum fuel to air mixture for gaseous fuel internal combustion engines.

Gaseous fuel means a fuel which is in the gaseous state at standard temperature and pressure. Examples of gaseous fuels used with internal combustion engines are: natural gas (derived from a liquid or compressed gas storage state), and propane/butane gas (derived from liquid petroleum gas storage).

Many internal combustion engine applications use direct fuel injection systems instead of pressure regulators and carburetors, but for engines using gaseous fuels there are some significant advantages to using a regulator and carburetor instead of fuel injectors.

Contamination. Gaseous fuels, most evident in LPG, have many contaminants that clog the small orifices in fuel injectors and cause failures, reduce component life, or increase maintenance. Regulators and carburetors do not have any small orifices that are affected by contamination from gaseous fuels.

Improved fuel and air mixture. Inadequate mixing of the fuel and air prior to combustion can lead to a decrease in fuel efficiency and an increase in engine emissions. In particular, gaseous fuel mixing with air is accomplished much better using a continuous flow device (regulator and carburetor) than with a discrete flow device (fuel injector).

In spark ignited engines, fuel can be introduced to the combustion chamber in two different states; vapor and liquid. For either of these states to be injected, the fuel must be at a higher pressure, and it must be free from contaminants that would inhibit the operation of the injector. Because of the contaminants contained in propane, injection can be problematic on propane spark ignited engines. Vapor carburetion provides a good alternative method of propane fuel introduction to the engine.

While the carburetor is designed to mix the fuel and air and adjust fuel to match the speed and load of the engine, it has only "ballpark" accuracy. This accuracy is not fine enough to achieve emissions targets. To achieve accurate fueling, the fuel pressure to the carburetor (in reference to the air inlet pressure to the carburetor) can be controlled. This is done in with the Electronic Pressure Regulator of this invention.

SUMMARY OF THE INVENTION

The invention includes a very fast voice coil actuator, in the range of 2-5 millisecond full stroke response with high force, a circuit board located in the enclosure, a pressure sensor sensing pressure internal to the system which in the preferred embodiment is located in the actuator cap assembly but could be located in other locations, a diaphragm, a link plate, a mating ring, and a mechanical pressure regulator. An electronic pressure regulator receives pressure commands from the engine control module in a manner similar to receiving pulse width from an engine control module to an injector and calculates the required new pressure command. A novel feature of the present invention includes the Delta P control and the control of the regulator based on direct feedback of pressure.

An Electronic Pressure Regulator ("EPR"), serves two functions, to vaporize the liquid propane and to control the vapor pressure to a mixer, i.e., carburetor. As the propane vaporizes, the EPR monitors and controls the vapor pressure out of the EPR (and to the mixer) in reference to the inlet air pressure to the carburetor, from the engine computer that was calibrated for all speeds and loads. There is a sensor, which may be internal to the EPR, that measures the actual Delta P of the delivered fuel. The EPR will then adjust the fuel pressure to the carburetor so that the actual Delta P matches the Delta P command from the ECM.

A benefit of this invention is that this device can operate at lower pressures than a typical fuel injection system. Lower pressure correlates to larger metering orifices which are more tolerant to heavy-end hydrocarbons that are found many fuels.

Also, this device typically outputs a continuous flow of fuel to the carburetor which better matches the air flow to the engine through the carburetor. The improved match of fuel and air results in better mixing of the two resulting in a large improvement in emissions when compared to a typical pulse-width modulated fuel injection system.

Additional benefits are that it is less expensive of a system than standard fuel injection. Better fuel economy is another benefit. And, the benefit of being able to use standard fuel that is contaminated and have the system actually last a long time, unlike most standard fuel injection systems.

DESCRIPTION OF THE PREFERRED EMBODIMENTS

Figure 7:
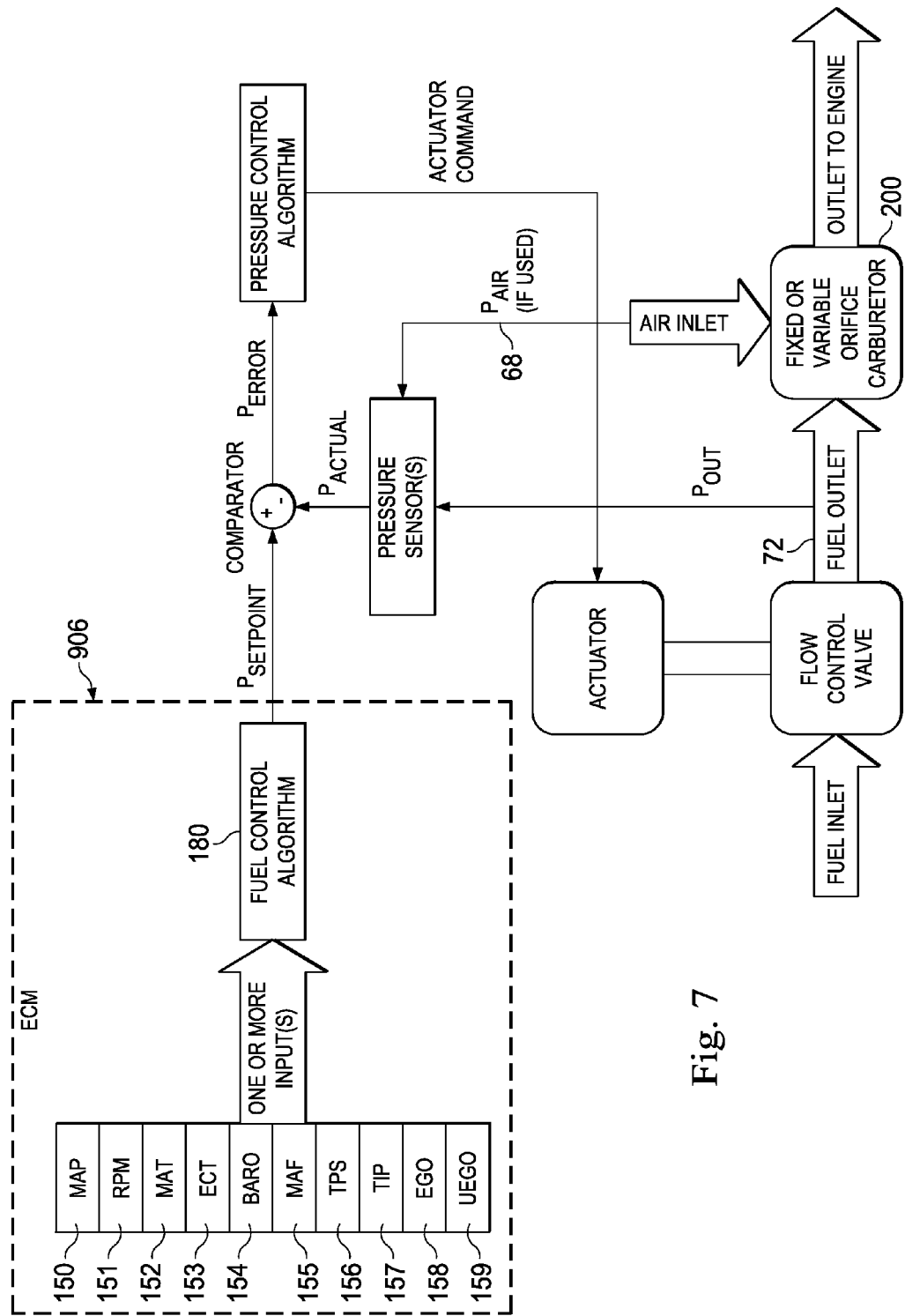
FIG. 7 is a diagram of the operation and control of the electronic pressure regulator according to the exemplary embodiment.

In the present invention, an operation diagram of the operation and control of the electronic pressure regulator is set forth in FIG. 7 illustrating how all of the regulation and vaporization of the fuel is done in one unit with a very fast actuator. A single pressure sensor monitors the unit's performance by measuring difference between the pressure $P_{Out}$ at the fuel outlet and the pressure $P_{Air}$ at the air inlet.

In the preferred embodiment, real time pressure control is achieved through the use of a Comparator and Pressure Control Algorithm. The desired pressure $P_{Setpoint}$ is compared to the actual pressure $P_{Actual}$ in Comparator. The output of Comparator, $P_{Error}$ is input into the Pressure Control Algorithm the output of which is Actuator$_{Command}$.

The Pressure Control Algorithm could include any common or advanced control loop transfer function including, but not limited to, series, parallel, ideal, interacting, noninteracting, analog, classical, and Laplace types. The Pressure Control Algorithm utilizes a simple proportional-integral-derivative (PID) algorithm of the following type (exemplified by the following transfer function):

$$\text{Actuator}_{Command} = K_p P_{Error} + \int K_i P_{Error} dt + K_d (d/dt) P_{Error}$$

Where $K_p$, $K_d$, and $K_i$ are, respectively, the appropriate proportional, derivative, and integral gains.

Figure 1:
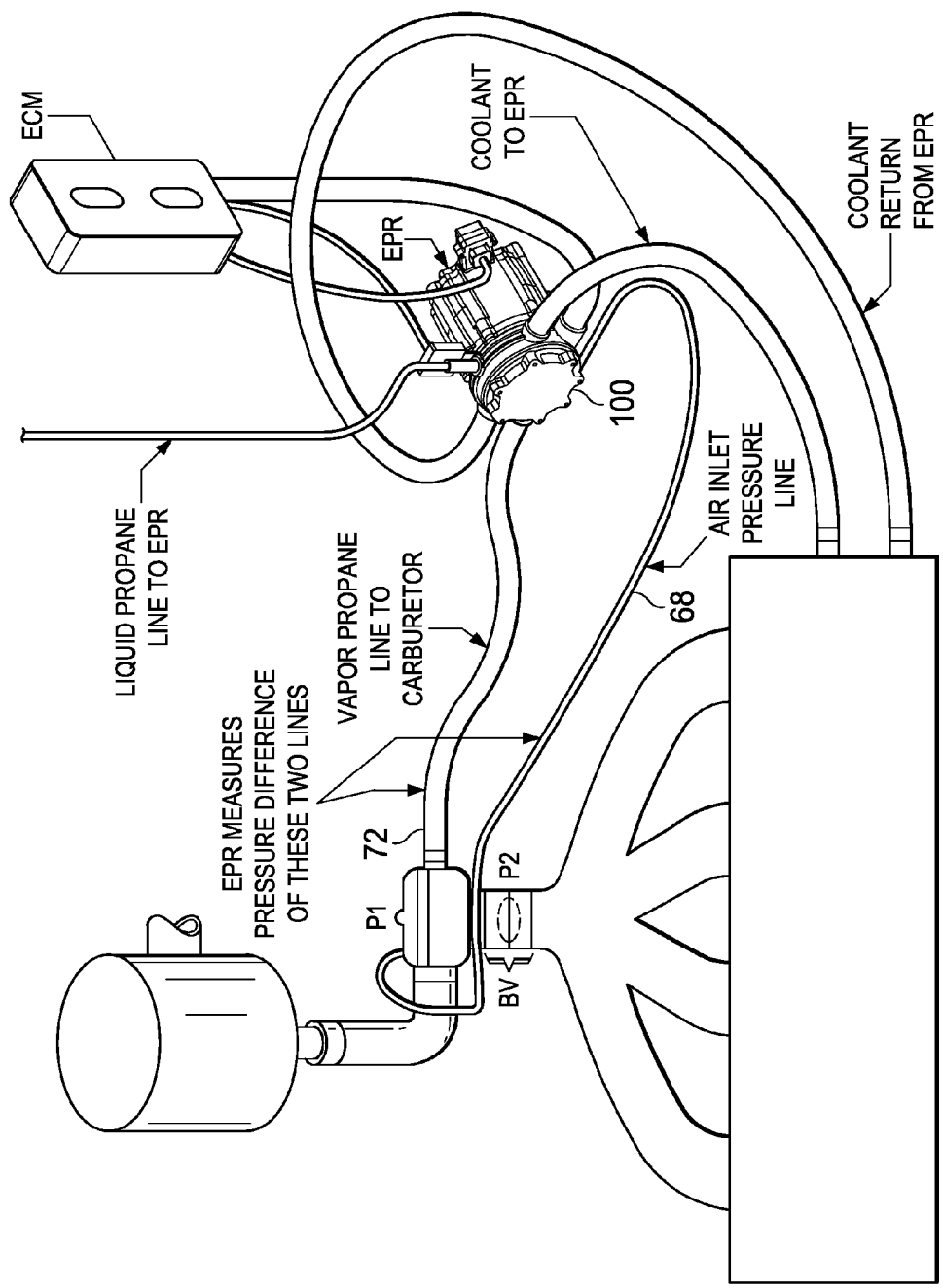
FIG. 1 is an illustration of a fuel control system with an electronic pressure regulator of the current invention.
Figure 2:
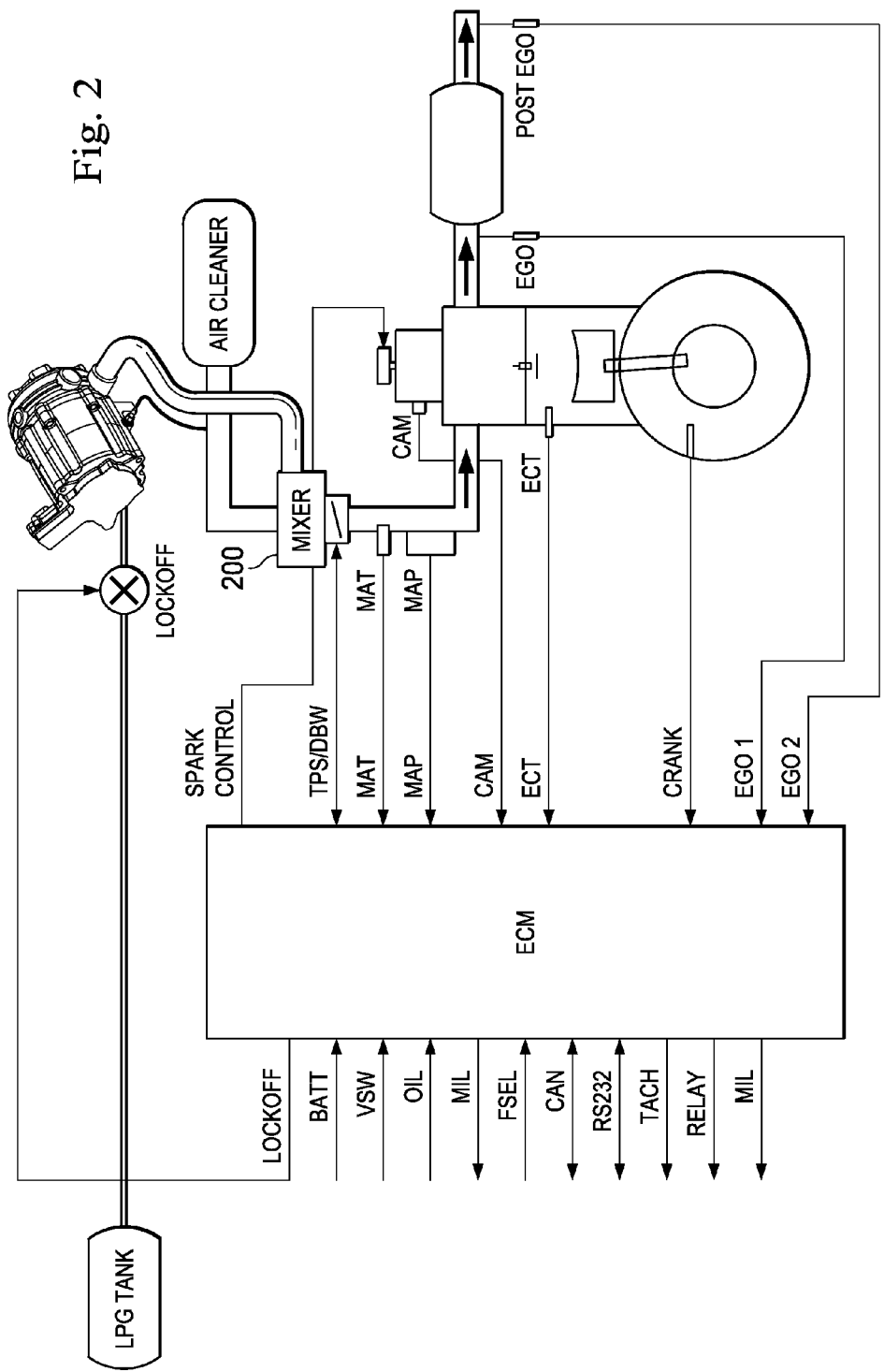
FIG. 2 is another illustration of the electronic pressure regulator according to the exemplary embodiment.

The pressure sensor senses pressure going to the carburetor. In the present invention, a venture carburetor or variable venturi carburetor can be used. As shown in FIG. 1 the terms mixer and carburetor can be used interchangeably.

The pressure $P_{Actual}$ being measured by the pressure sensor is the differential between $P_{Out}$ and the $P_{Air}$. Although the preferred embodiment utilizes a single differential pressure sensor, an additional embodiment could use two separate pressure sensors and an additional comparator to result in a similar $P_{Actual}$ output.

An additional embodiment utilizes a single pressure sensor that only measures $P_{Out}$ and not $P_{Air}$.

A linear actuator (for example a connecting rod) responsive to a valve control signal (actuator command) output from the pressure control algorithm is linked to the diaphragm of the regulator. The linear actuator is a voice coil armature capable of operation at frequencies up to 1000 Hz. The position of the diaphragm regulates fuel pressure leaving the electronic pressure regulator and entering the engine.

The pressure regulator diaphragm position is controlled by a combination of two factors:

(1) Standard mechanical operation force balance: The diaphragm, piston, etc. moves to a force balanced position based on the delta pressure on the two sides of the diaphragm verses the spring force.

(2) Additional force (pushing or pulling) on the diaphragm created by the linear voice coil actuator. The additional force provided by the linear actuator is enough force to completely override the standard mechanical force balance, thus giving the EPR full control over fuel pressure leaving the actuator.

As shown in FIG. 7, an electronic control mechanism can provide the actuator command signal to the linear actuator in accordance with a pressure control algorithm. The direction and magnitude of the force created by the actuator on the diaphragm is determined based on the desired delta pressure between the engine inlet air pressure and the regulator outlet fuel pressure. The desired delta pressure at a given engine operating point is determined by engine development testing and live feedback from sensors monitoring engine performance. Both the air inlet pressure from the mixer and regulator outlet pressure to the fuel line are available for measurement at the EPR which contains an integrated delta pressure sensor.

The combination of a rapid response force solenoid (voice coil) and a high bandwidth control signal (delta pressure sensor) allows the EPR to achieve unprecedented response time to engine operating conditions.

FIGS. 3, 4, 5, and 6 illustrate various views of the electronic pressure regulator (EPR 100). EPR 100 is seen to be comprised of three sub-assemblies, actuator cap assembly (40), voice coil actuator (50), and mechanical pressure regulator (60).

Functionally, cap assembly (40) will receive and/or process signals from the ECM, (which may be separate or internal with cap assembly 40) and generate a signal to the voice coil actuator (50), which signal is a actuator command signal, a function of pressure error as measured between the set point pressure generated by the fuel control algorithm and the actual pressure sensed in the P out line. The cap assembly (40) will generate a signal to the voice coil of voice coil actuator (50), the signal being responsive to the difference between pressure set point and actual pressure, which signal will control the connecting rod (7). Connecting rod (7) is operatively coupled to a diaphragm (26). Movement of the diaphragm responsive to the voice coil, which is driving connecting rod (7), will move lever (25) operating the seat/jet/port assembly (103) to regulate output pressure, which feeds fuel to the carburetor.

The function of mechanical pressure regulator (60) is to provide fuel at a variable pressure to the outlet port (34). Outlet port (34) is operatively connected to the line (72) feeding fuel to the carburetor (200) in FIG. 7.

Figure 4:
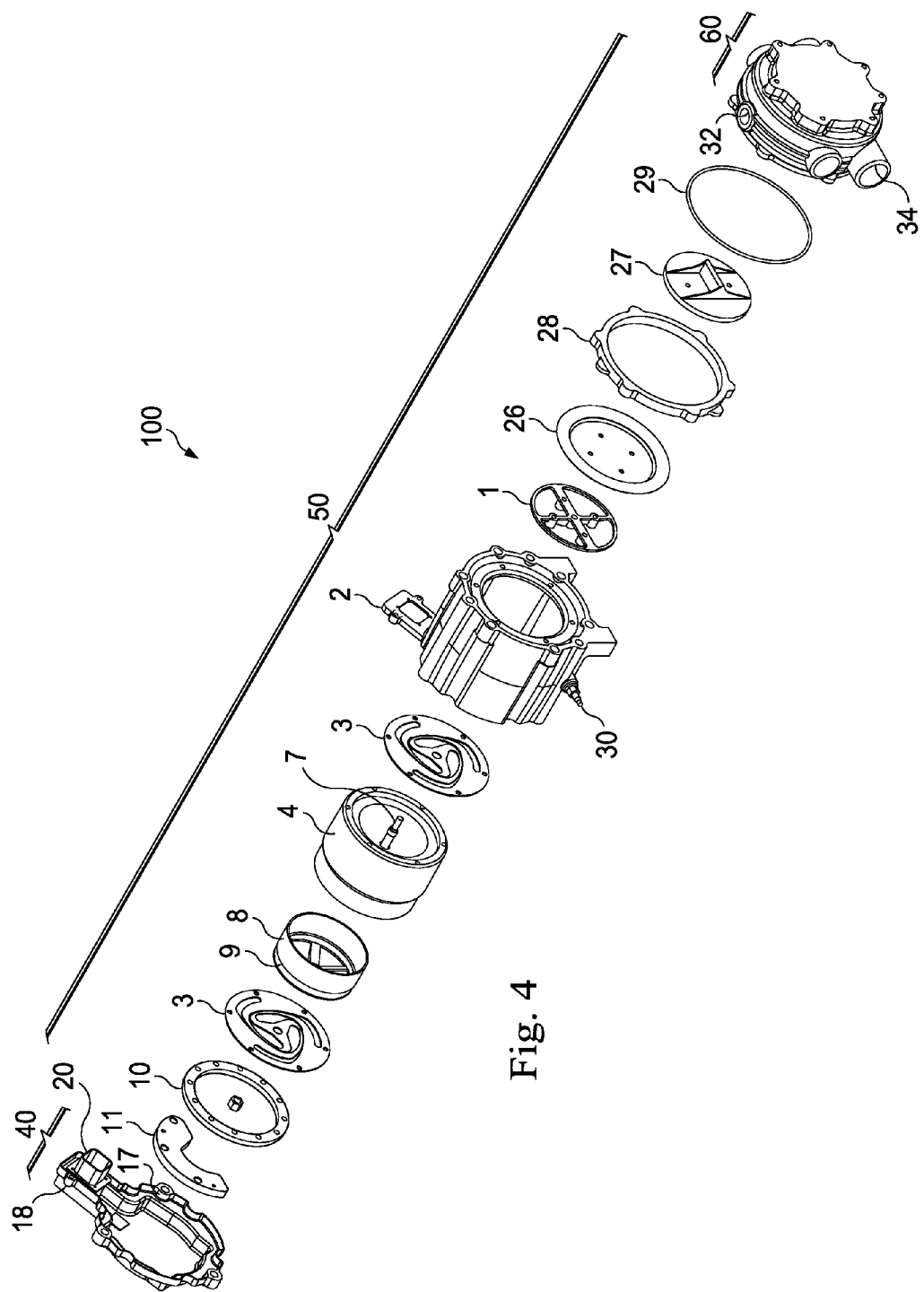
FIG. 4 is an exploded view of the exemplary embodiment
Figure 5:
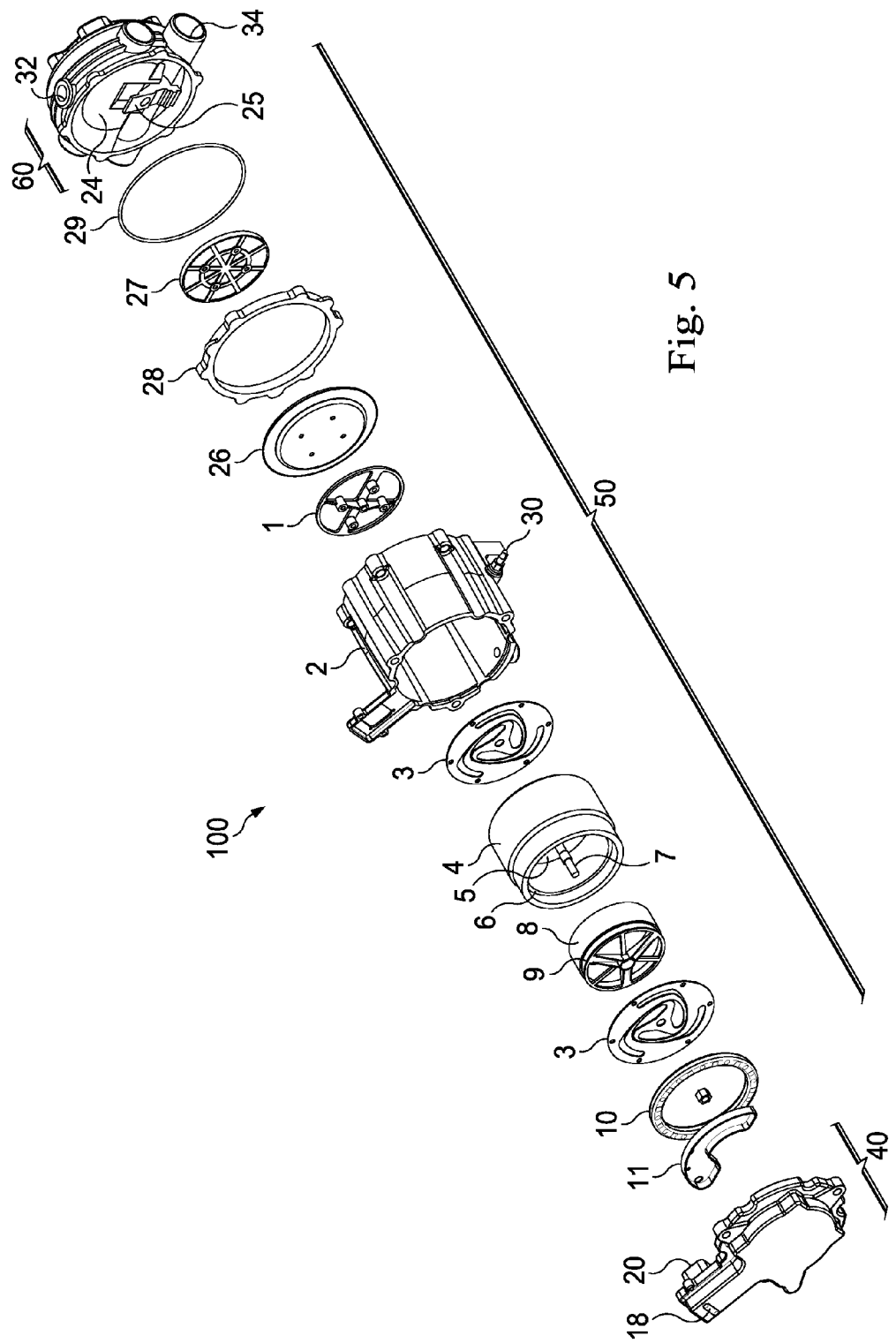
FIG. 5 is another exploded view of the exemplary embodiment.
Figure 6:
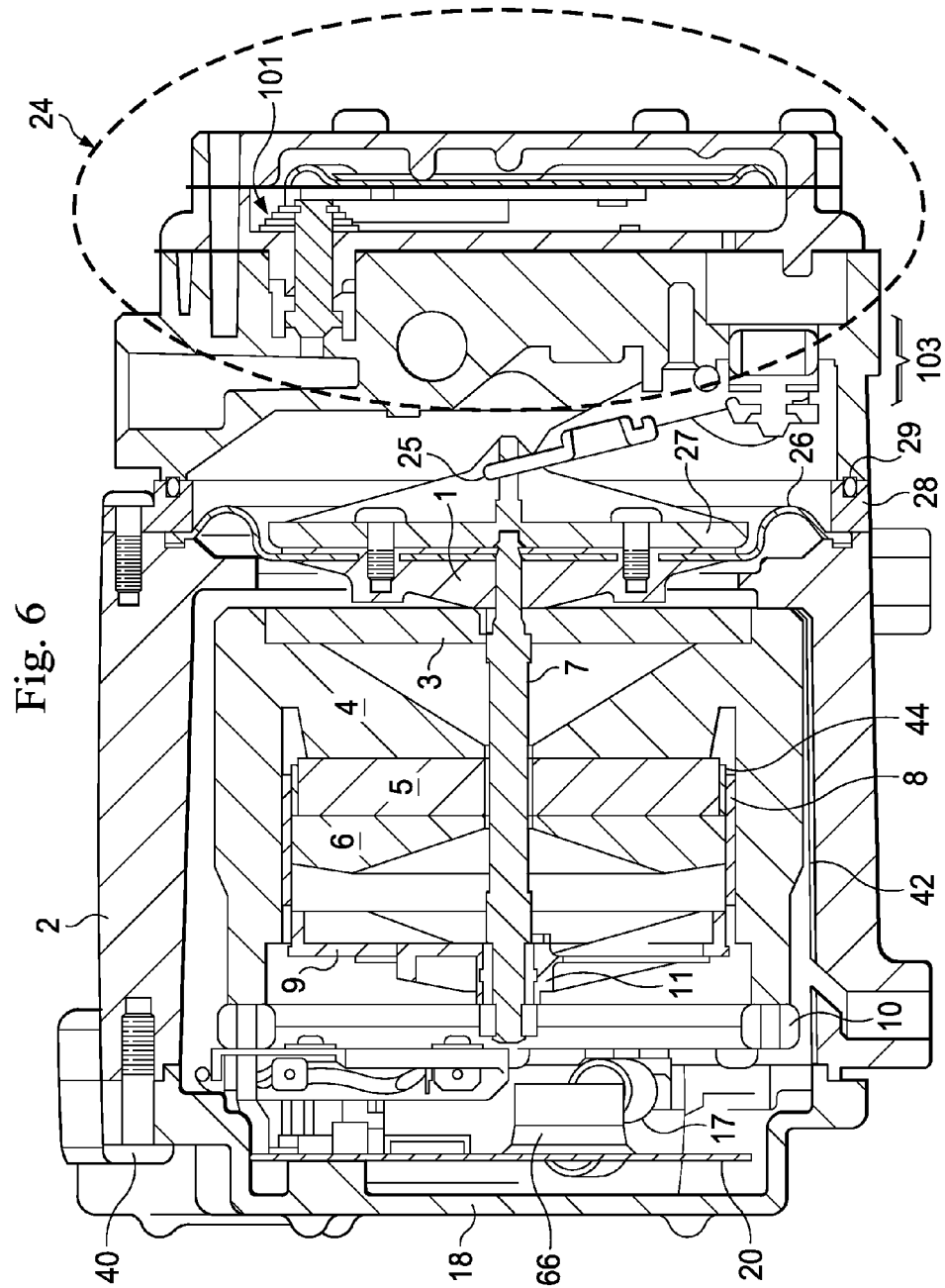
FIG. 6 is a longitudinal, assembled view of the exemplary embodiment taken along line x,x' of FIG. 3.

The function of pressure regulator (60) is to receive fuel such as LPG from a fuel tank and provide a regulator chamber for that fuel. Turning now to FIGS. 4, 5, and 6, it is seen that LPG is received at inlet port (32) and is controlled through primary diaphragm spring and lever assembly (101) to provide constant pressure in chambers A and B as seen in FIG. 6. As is also seen in FIG. 6, regulating gas pressure in Chamber B is controlled through a secondary stage regulator assembly, including lever (25) and diaphragm (26). More particularly, the secondary stage assembly controls the seat jet and port assembly between chambers B and C. Chamber C is a regulator chamber regulated by seat jet port assembly (103) and is in gaseous communication with outlet (34) which will carry the vaporized fuel through line (72) to carburetor (74) (see operation schematic FIG. 7).

Figure 3:
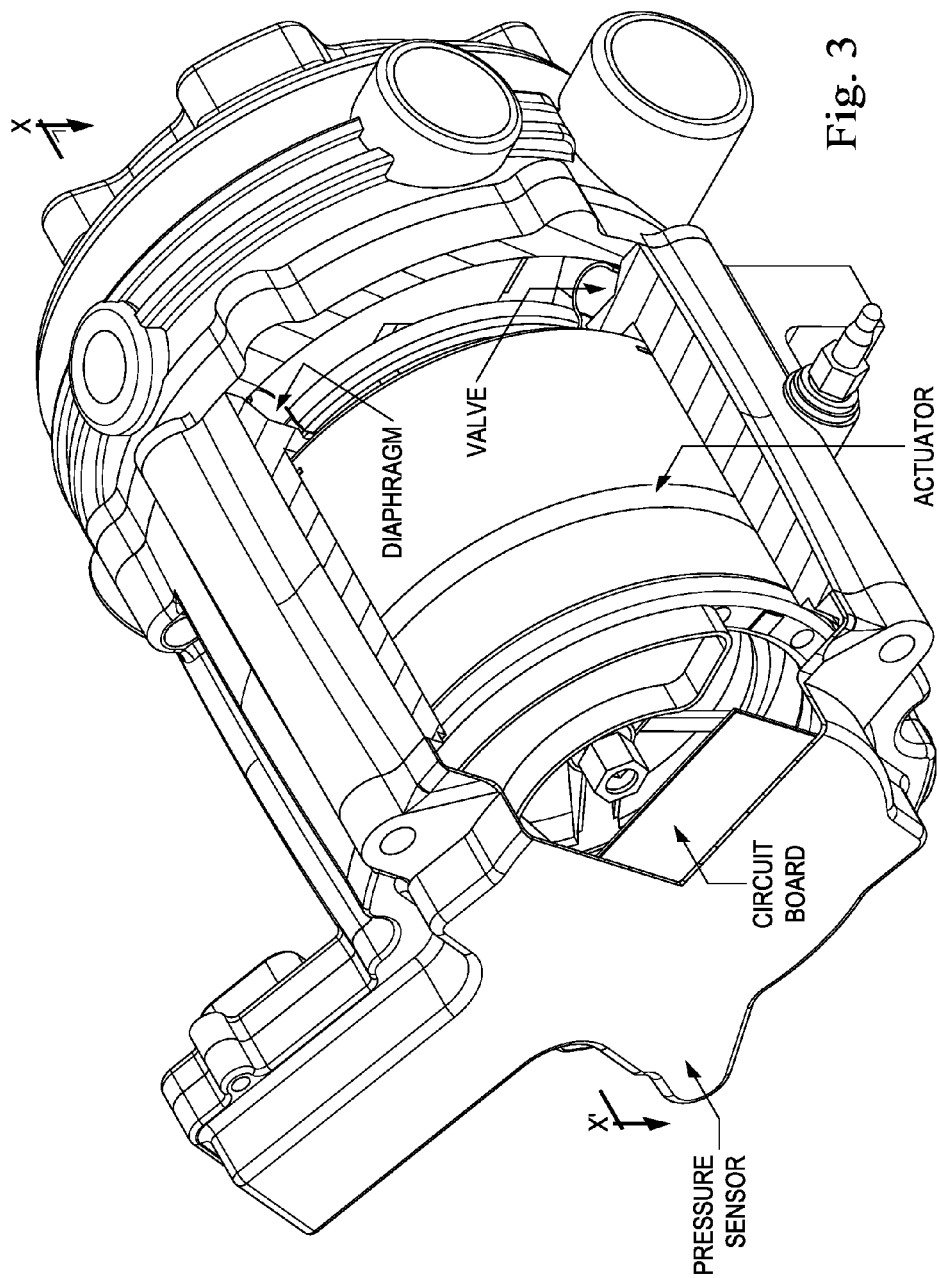
FIG. 3 is a cutaway view of the electronic pressure regulator according to the exemplary embodiment.

It is further seen with reference to FIGS. 3, 4, and 5 that the diaphragm (26) between chambers C and D is operatively engaged with connecting rod (7) which, in turn, is controlled by signals received in the voice coil (8). Moreover, chamber D receives an air pressure from the carburetor (200), P-Air, as seen in FIG. 1 and FIG. 6.

The P-Air from the carburetor found in cavity D and without any activation of the voice activated coil (8), unit (100) acts as a standard mechanical pressure regulator controlling the pressure to gas at port (34).

Turning now to a car at idle, it can be seen with reference to the figures that depressing the accelerator will open the throttle control valve, for example, a butterfly valve (By), located below the carburetor as illustrated in FIGS. 1, 3, 4, 5 and 7. When this occurs, a drop in pressure will occur in fuel outlet line (72) which is connected to outlet port 34 (seed FIG. 4) and, therefore, in chamber C. A drop in pressure in chamber C will allow the seat jet port assembly (103) to open allowing gas to flow into chamber C and out to the carburetor.

Explained in the paragraph above is the mechanical aspects of Applicant's invention. However, Applicant provides for pressure sensing in the fuel outlet line, preferably said pressure is measured against a pressure set point defined by the fuel control algorithm, which is in turn a function of, in part, throttle position. If there is an error between the pressure sensed in the fuel outline line and the pressure set point, from that error an electronic signal is sent to the voice coil which, operating on the actuator rod can move the diaphragm between chambers C and D. Such movement, responsive to the error "corrects" the pressure in chamber C. Of course, the pressure in chamber C is the pressure of the fuel in the fuel outlet line. Thus, Applicant has provided the ability to fine tune pressure in the EPR fuel outlet line as a function of not only a mechanical pressure differential but an electronic measured preferred pressure set point, which pressure set point is a preferred pressure in the fuel outlet line defined by a number of conditions set forth in the ECM and fuel control algorithm.

In a preferred embodiment, pressure sensor (66) can receive pressure from both the fuel outlet line designated P-Out (72) in the operation schematic and P-Air (68). The use of P-Air (68) provides compensation, for example, for altitude changes in various configurations for changing the configurations of the air inlet (for example, a clogged air cleaner.)

Turning out the details of EPR (100), mechanical pressure regulator (MPR) (60) is engaged, in ways known to the trade to actuator housing through the use of adapter (28). As stated above, MPR (60) is an "off the shelf" mechanical pressure regulator, for example IMPCO "Cobra". It is adapted through the use of adapter 28 which also acts as a clamp to seal diaphragm (28) to actuator chamber housing (2) which defines a chamber. Received inside the chamber is pot core (4) which is one component of a magnetic structure for actuator.

Pot core, Magnet and front plate 4, 5, and 6 provide the magnetic structure, which is provided to interact with voice coil 8, which comprised wire windings which receive the actuator command current to provide an actuator force.

Moveable elements are connecting rod (7), Coil (8), and Coil cap (9) and are engaged together and through a pair of flexure elements (3). The flexure elements (3) are in turn is fixedly secured to the housing of the chamber. The moveable elements are suspended substantially within the pot core (a ferrous substance), and the magnetic field generated by changes in the current in the coil respond to the magnetic field of the fixed magnet. The moveable elements are suspended and free to move as set forth below, and this movement responsive to the current changes in the voice coil (8).

Flexures 3 typically a pair serve a number of functions. They are engaged at the perimeter thereof to actuator housing (3). However, their novel shape allows it to engage the connecting rod, engaging the connecting rod at the center (88) of the flexures 3 and held at along the longitudinal axis of the diaphragm (26) while being allowed to move longitudinally freely, responsive to the current and the voice coil. The connecting rod 7 engages the diaphragm at upper link 1. Upper link 1 is engaged with fasteners through diaphragm 6 to lower link plate 27.

The actuator rod 7 can be suspended along the launch to the axis of the voice coil and be maintained along the longitudinal axis of the voice coil at either end thereof. Connector rod 7 is maintained along this axis, but allowed to flex along that axis responsive to changes of current in the voice coil. Thus the use of flexures provides for an accurate longitude in the location of a connecting rod within the voice coil, and with the end of the voice coil.

Figure 8:
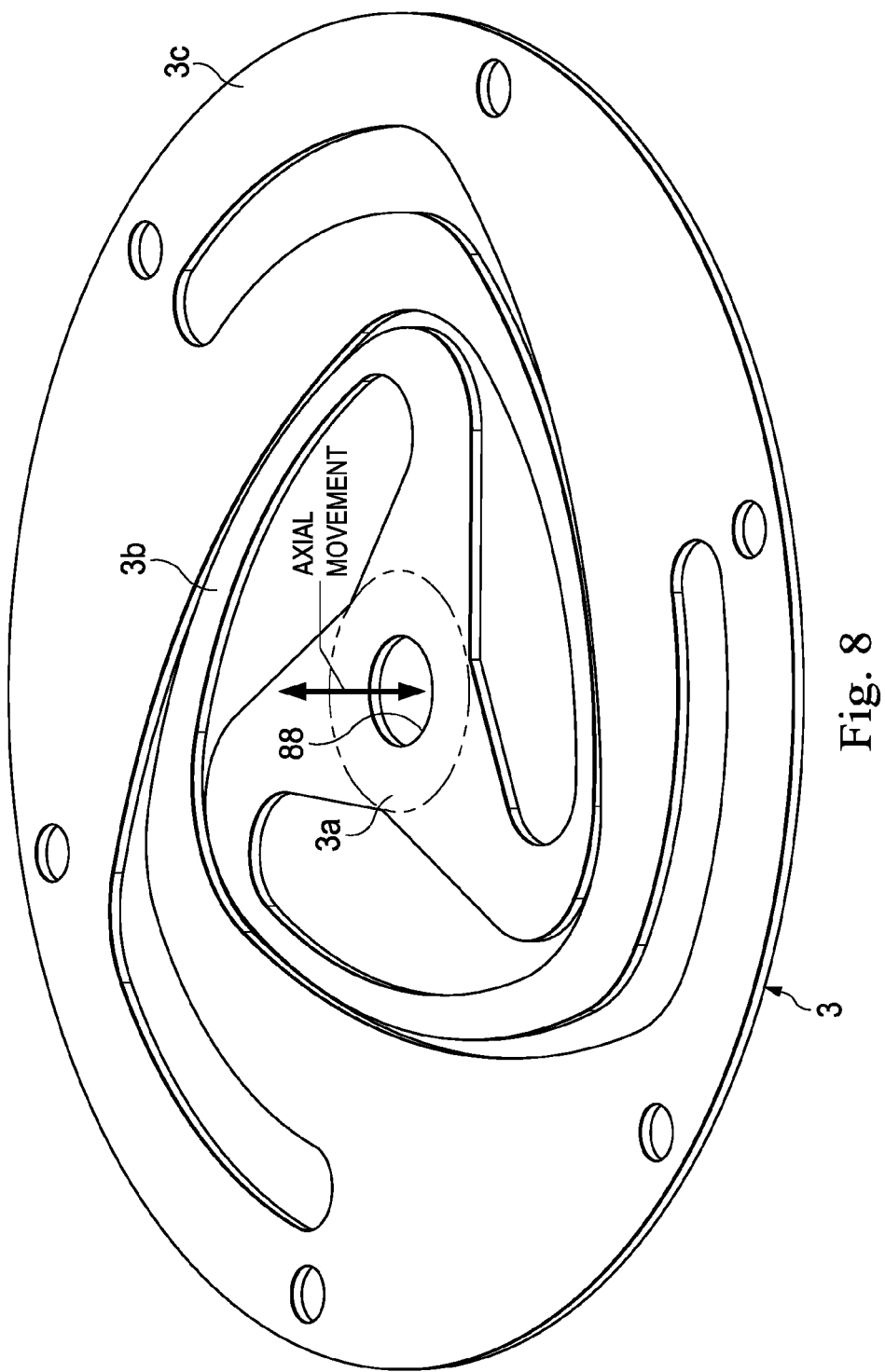
FIG. 8 is an illustration of a flexure element located in the electronic pressure regulator of the exemplary embodiment.
Figure 9:
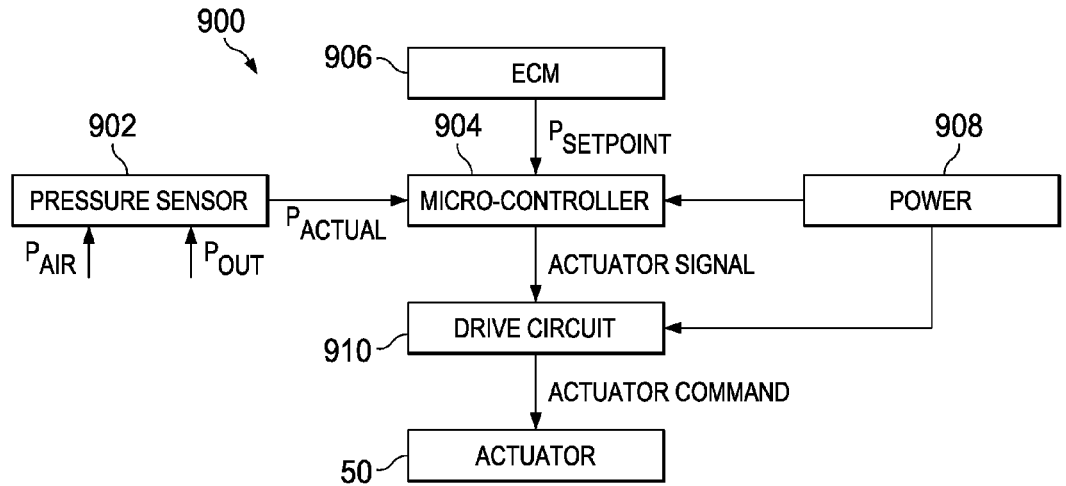
FIG. 9 is a block diagram of the operation of the electronics according to the exemplary embodiment of the invention.
Figure 10:
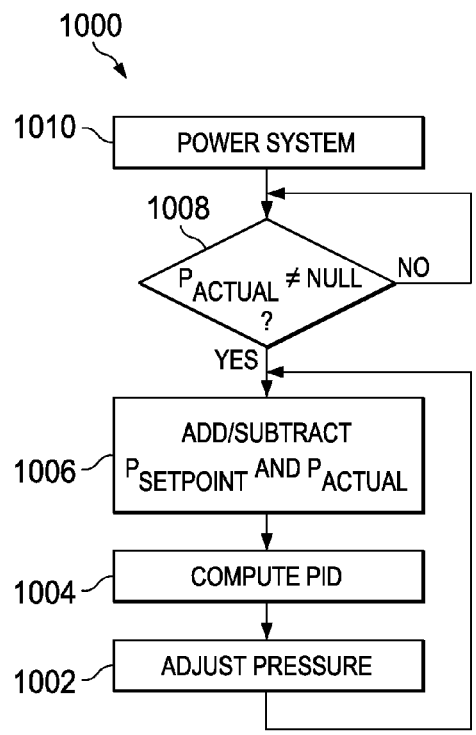
FIG. 10 is a software flow diagram for the operation of the microcontroller of the exemplary embodiment of the invention.

In about the two flexures, the structure of which may be appreciated with respect to FIG. 8, provide rigidity in maintaining the connector rod longitudinally, while allowing the rod, whose nose is engaged with upper link plate 1 to move axially (left and right, FIG. 4), and thus diaphragm 26. Flexures also provide infinite life of linear actuator cycling due to zero contact or friction between the moving and stationary portions of the actuator. The absence of friction in the suspension element(s) provides for extremely accurate behavior and control of the linear actuator. Another benefit to the use of a flexure(s) is that it provides a means for linear travel with minimal space requirements The operation of the circuit board will now be described with reference to FIG. 9. Upon initialization, the ECM 906 sends a signal P-setpoint to the microcontroller 904. Microcontroller 904, which can be any commercially available microcontroller with a memory that is capable of receiving machine readable code, i.e. software. Microcontroller 904 provides the "brains" of the invention, and receives pressure signal S from pressure sensor 902, and outputs as an actuator signal to drive circuit 910. Drive circuit 910 can be any commercially available driver, e.g. a Motorola H-bridge drive circuit, and provides a signal to the coil 8 of voice coil actuator assembly 50. While the above description is a generalization of the operation of the circuitry of Applicant's invention, one skilled in the art will appreciate the different electronic components that may be added to the above without departing from the spirit and scope of the invention The operation of the microcontroller 904 will now be describe with reference to FIG. 9 and FIG. 10. When the regulator of the instant embodiment is powered on, the microcontroller 904 goes into standby, i.e., waits pressure sensors 902 to send a signal indicative of the differential between P-air and P-out, delta-p[step 1008]. It should be noted that at this point the electronic pressure regulator of the instant embodiment is functioning as a mechanical regulator. When microcontroller 904 receives the delta-p signal from pressure sensors 902, microcontroller 904 adds or subtracts from the pressure signal [P-actual], the desired pressure from the ECM, or the P setpoint [step 1006]. The result of this calculation is the pressure error, or P-error. Using a PID or similar in step 1004, he pressure error P error is converted to a value the actuator must move to adjust the pressure P actual to equal the P-setpoint Once this value is calculated, the microcontroller 904 sends an actuator signal to the drive circuit 910, so that the drive circuit can cause the actuator to move, thereby adjusting P output.

While certain features and embodiments of the invention have been described in detail herein, it will be readily understood that the invention encompasses all modifications and enhancements within the scope and spirit of the following claims.

What is claimed is:

1. A fuel system, comprising:
a fuel mixer including a fuel inlet;
an engine control module; and
a fuel pressure regulator coupled to the engine control module and the fuel mixer, the fuel pressure regulator comprising:
a pressure sensor that is operable to detect a fuel inlet pressure at the fuel inlet and use the fuel inlet pressure to generate a first pressure signal;
a microprocessor operable to receive the first pressure signal from the pressure sensor and a second pressure signal from the engine control module and generate a third pressure signal that is related to a difference between the first pressure signal and the second pressure signal;
an actuator coupled to the microprocessor and operable to receive the third pressure signal, wherein the actuator includes an actuator member coupled to at least one flexure element that provides the actuator member with a predetermined range of motion; and
a pressure actuated regulator device coupled to the actuator member, wherein, in response to the actuator receiving the third pressure signal, the actuator member moves along the predetermined range of motion to cause the pressure-actuated regulator device to adjust the fuel pressure in the fuel line.

2. The system of claim 1, wherein the at least one flexure element comprises a pair of flexures elements in a spaced apart orientation.

3. The system of claim 1, wherein the at least one flexure element comprises a perimeter that is secured to the housing.

4. The system of claim 1, wherein the at least one flexure element comprises a plurality of spiral shaped members extending from a secured section and each coupled to the actuator member to provide the actuation member with the predetermined range of motion.

5. The system of claim 1, wherein the actuator member comprises a rod.

6. The system of claim 1, wherein the predetermined range of motion is linear.

7. The system of claim 1, further comprising:
a casing housing the pressure sensor, the microprocessor, the actuator, and the pressure actuated regulator device.

8. The system of claim 1, wherein the at least one flexure element is fabricated from a single piece of material and includes a moveable section operable to flex relative to a secured section to provide the actuator member with the predetermined range of motion.

9. The system of claim 1, wherein the fuel mixer includes a air inlet and the first pressure signal is related to the difference between the fuel inlet pressure at the fuel inlet and an air inlet pressure at the air inlet.

10. A fuel supply system, comprising:
a carburetor including a carburetor fuel inlet;
an electronic fuel pressure regulator including a regulator fuel outlet that is coupled to the carburetor fuel inlet, the electronic fuel pressure regulator comprising:
a microprocessor operable to receive an operating pressure signal related to a fuel pressure between the regulator fuel outlet and the carburetor fuel inlet and generate an actuator signal that is related to a difference between the operating pressure signal and a desire pressure signal;
an actuator coupled to the controller and operable to receive the actuator signal, wherein the actuator includes a rod coupled to a moveable section on at least one flexure element, wherein the moveable section provides the actuator member with a predetermined range of motion; and
a valve coupled to the rod, wherein the rod is operable to move in response to the actuator receiving the actuator signal, and wherein movement of the rod results in movement of the valve to adjust the fuel pressure in the fuel line.

11. The system of claim 10, wherein the carburetor includes a carburetor air inlet and the operating pressure signal is related to a difference between the fuel pressure between the regulator fuel outlet and the carburetor fuel inlet and an air pressure at the carburetor air inlet.

12. An electronic pressure regulator for use with a gaseous fuel internal combustion engine having an engine control module, a fuel line source having an outlet in communication with the engine, a fuel line including a controllable valve for regulating the gaseous fuel pressure at the outlet, and a venturi carburetor in communication with the fuel line outlet and the engine, wherein the actuator used to control the valve has flexures.

13. An electronic pressure regulator, comprising:
a controller operable to provide an actuator signal that is related to a pressure difference based on a fuel pressure in a fuel line and a desired fuel pressure;
an actuator coupled to the controller and operable to receive the actuator signal, wherein the actuator includes an actuator member coupled to at least one flexure element, and wherein the at least one flexure element includes a secured section that is secured to a housing and a moveable section that is coupled to the actuator member and provides the actuator member with a predetermined range of motion; and
a pressure actuated regulator device coupled to the actuator member, wherein the actuator member is operable to move in response to the actuator receiving the actuator signal, and wherein movement of the actuator member results in movement of the pressure-actuated regulator device to adjust the fuel pressure in the fuel line.

14. The electronic pressure regulator of claim 13, wherein the at least one flexure element comprises a pair of flexures elements in a spaced apart orientation.

15. The electronic pressure regulator of claim 13, wherein the secured section of the at least one flexure element comprises a perimeter of the at least one flexure element that is secured to the housing.

16. The electronic pressure regulator of claim 13, wherein the moveable section of the at least one flexure element comprises a plurality of spiral shaped members extending from the secured section and each coupled to the actuator member.

17. The electronic pressure regulator of claim 13, wherein the predetermined range of motion is linear.

18. The electronic pressure regulator of claim 13, further comprising:
a casing housing the controller, the actuator, and the pressure actuated regulator device.

19. The electronic pressure regulator of claim 13, wherein the at least one flexure element is fabricated from a single piece of material, and the moveable section of the at least one flexure element is operable to flex relative to the secured section to provide the actuator member with the predetermined range of motion.

20. The electronic pressure regulator of claim 13, wherein the pressure difference based on the fuel pressure in the fuel line and the desired fuel pressure is further based on a difference between the fuel pressure and an air pressure in an air line.

\* \* \* \* \*

UNITED STATES PATENT AND TRADEMARK OFFICE
CERTIFICATE OF CORRECTION

| | | |
|---|---|---|
| PATENT NO. | : 8,176,897 B1 | Page 1 of 1 |
| APPLICATION NO. | : 12/978190 | |
| DATED | : May 15, 2012 | |
| INVENTOR(S) | : Kennon H. Guglielmo et al. | |

It is certified that error appears in the above-identified patent and that said Letters Patent is hereby corrected as shown below:

On cover page (under Related U.S. Application Data), change (62) data reading:
"Division of application No. 11/823,945, filed on Jun. 29, 2007, now Pat. No. 8,006,668"

to read:
--Related to Application No. 12/978,109 filed December 23, 2010, now Pat. No. 8,136,506, and Application No. 12/978,215 filed on December 23, 2010, and is a divisional of Application No. 11/823,945, filed on June 29, 2007, now Pat. No. 8,006,668.--

In column 1, line 1 (under Cross Reference to Related Applications), change the line reading:
"The present application is related to (1O U.S. Utility appli-"

to read:
--The present application is related to (1) U.S. Utility appli- --

In column 5, line 16 (under Description of the Preferred Embodiments), change the line reading:
"throttle control valve, for example, a butterfly valve (By),"

to read:
--throttle control valve, for example, a butterfly valve (BV),--

Signed and Sealed this
Twenty-fourth Day of July, 2012

David J. Kappos
*Director of the United States Patent and Trademark Office*